(12) United States Patent
Debaud et al.

(10) Patent No.: US 12,066,794 B2
(45) Date of Patent: Aug. 20, 2024

(54) DEVICE AND METHOD FOR TESTING A MECHANICAL PROPERTY OF A TIMEPIECE SHAFT

(71) Applicant: ROLEX SA, Geneva (CH)

(72) Inventors: Samuel Debaud, Plagne (FR); Daniel Sallin, Villy-le-Bouveret (FR); Alain Semoroz, Lausanne (CH)

(73) Assignee: ROLEX SA, Geneva (CH)

( * ) Notice: Subject to any disclaimer, the term of this patent is extended or adjusted under 35 U.S.C. 154(b) by 447 days.

(21) Appl. No.: 17/547,487

(22) Filed: Dec. 10, 2021

(65) Prior Publication Data
US 2022/0187053 A1    Jun. 16, 2022

(30) Foreign Application Priority Data

Dec. 16, 2020   (EP) .................................... 20214483

(51) Int. Cl.
*G04D 7/00*     (2006.01)
*G01B 5/24*     (2006.01)
*G04B 31/008*   (2006.01)
*G04B 31/06*    (2006.01)

(52) U.S. Cl.
CPC ............ *G04D 7/001* (2013.01); *G01B 5/24* (2013.01); *G04B 31/008* (2013.01); *G04B 31/06* (2013.01)

(58) Field of Classification Search
CPC ........ G04D 7/00; G04D 7/001; G04B 31/008; G04B 31/06; G01B 3/008; G01B 5/0002; G01B 5/0004; G01B 5/30; G01B 21/32; G01M 5/00; G01M 5/0025; G01M 5/0041; G01M 5/005; G01M 5/0058; G01M 5/0075; G01M 99/007; G01N 3/00; G01N 3/02; G01N 3/08; G01N 3/32
See application file for complete search history.

(56) References Cited

FOREIGN PATENT DOCUMENTS

| CH | 217285 A | 10/1941 |
|---|---|---|
| CH | 341695 A | 10/1959 |
| CH | 366189 A | 12/1962 |
| CH | 400921 A | 6/1965 |
| EP | 2887007 A1 | 6/2015 |

OTHER PUBLICATIONS

European Search Report and Written Opinion dated Jun. 2, 2021 in priority application No. EP20214483.8; with English machine translation (total 18 pages).
Schlatter et al., "Mesures de la fragilité des pivots d'axes de balancier" [Measurements of the fragility of balance-shaft pivots]; 46th congress of the Société Suisse de Chronométrie [Swiss Chronometry Society], Communication No. 4, Oct. 9-10, 1971; w/English machine translation (total 11 pages).

*Primary Examiner* — Benjamin R Schmitt
(74) *Attorney, Agent, or Firm* — Seckel IP, PLLC (57) ABSTRACT

The device (3) for testing a timepiece shaft (1) having at least one first pivot (10, 10') and an axis of rotation (A1), the device including a rest (2) having two supports (12, 12') intended to accommodate the timepiece shaft (1), at least one of the two supports (12) being intended to accommodate the at least one first pivot (10), an element (4; 4') for applying a mechanical force to the timepiece shaft, positioned such that this force is at least partially taken up by the support (12) at the at least one first pivot (10). The element (4; 4') for applying a mechanical force is arranged such that the timepiece shaft (1) is driven in rotation by a relative movement of the element (4; 4') for applying a mechanical force and the rest (2).

22 Claims, 4 Drawing Sheets

DEVICE AND METHOD FOR TESTING A MECHANICAL PROPERTY OF A TIMEPIECE SHAFT

INTRODUCTION

This application claims priority of European patent application No. EP20214483.8 filed Dec. 16, 2020, the content of which is hereby incorporated by reference herein in its entirety.

The invention relates to a device for testing a mechanical property of a timepiece shaft. The invention also relates to a method for testing a mechanical property of a timepiece shaft. The invention still further relates to a method for manufacturing and/or checking a timepiece shaft or a timepiece movement or a timepiece.

BACKGROUND ART

There is an interest in specifically defining the flexural strength and the tensile strength of the pivot of a timepiece shaft both to discriminate the proposed solutions and to verify that a minimum strength is ensured on production parts.

A known method from the prior art makes it possible to define the flexural strength of a balance shaft, which method consists in locking said shaft in a clamp such that its pivot can be subjected to radial load, with static forces, by way of a knife. The longitudinal position of the knife is adjusted by taking into account the geometry of the timepiece shaft. The point of contact corresponds approximately to that of a holed jewel with the shaft in a mounted configuration of the shaft, in particular of the pivot, in the jewel. The deformation angle created on the generatrix of the pivot by the radial load is visually measured, for example with a goniometer. The knife is connected to a force sensor for measuring the load applied to the pivot.

An apparatus for applying such a method makes it possible for example to measure the breaking angle, the breaking load and the limit of elastic deformation (residual deformation angle). (Mesures de la fragilité des pivots d'axes de balancier [Measurements of the fragility of balance-shaft pivots]; 46th congress of the SSC [Société Suisse de Chronométrie], communication no. 4, 9-10, October 1971).

Such a method is suitable for classifying metallic timepiece shafts, but it is destructive. It therefore does not make it possible to define and/or test a shaft in a production workflow involving a systematic check of a significant proportion of parts produced, or even of all the parts. It also does not make it possible to test the components over their entire circumference. Therefore, it does not make it possible to reliably and repeatably test components made of materials having failure modes that cannot be revealed on account of the punctiform nature of the applied force.

Flexural test methods have been developed specifically for ceramics, for example the three-point test or four-point test. Monolithic test specimens, generally of rectangular shape, are placed on a support with two points of contact, and one or two loads are applied to the test specimen at predetermined distances from the two points of contact with the support.

However, these methods are useful for testing a material and not a part, for which the geometry is a specific factor and the properties of which often depend on the manufacturing history.

Moreover, the tests are carried out in localized mode and are therefore not representative of the stresses to which a timepiece shaft has to be subjected over its circumference.

SUMMARY OF THE INVENTION

The object of the invention is to provide a test device that improves the devices known from the prior art. In particular, the invention provides a test device for reliably defining and/or testing any timepiece component with a geometry exhibiting symmetry of revolution, such as for example a timepiece staff or shaft, more particularly a balance shaft or an escapement-wheel shaft, a pin, an arbor, a tube, a screw, or a bar.

A test device according to the invention is defined by point 1 below.

1. A device for testing a timepiece shaft comprising at least one first pivot and an axis of rotation, the device comprising:
   a rest comprising two supports intended to accommodate the timepiece shaft, at least one of the two supports of which is intended to accommodate the at least one first pivot,
   an element for applying a mechanical force to the timepiece shaft, positioned such that this force is at least partially taken up by the support at the at least one first pivot,
   wherein the element for applying a mechanical force is arranged such that the timepiece shaft is driven in rotation by a relative movement of the element for applying a mechanical force and the rest.

Various embodiments of the device are defined by points 2 to 10 below.

2. The test device as defined in the preceding points, wherein the relative movement of the element for applying a mechanical force with respect to the rest is a displacement along a direction perpendicular or substantially perpendicular to the axis of the timepiece shaft and/or wherein the mechanical force on the timepiece shaft is at least substantially perpendicular to the axis of rotation.

3. The test device as defined in either of the preceding points, wherein the device comprises:
   a fixed frame, and
   a first actuator for driving the element for applying the mechanical force in relation to the fixed frame and/or a second actuator for driving the rest in relation to the fixed frame.

4. The test device as defined in one of the preceding points, wherein the device is arranged such that a relative movement travel of the element for applying a mechanical force with respect to the rest causes at least one revolution or at least one and a half revolutions of the timepiece shaft about its axis of rotation.

5. The test device as defined in one of the preceding points, wherein at least one support comprises a notch for accommodating the at least one first pivot.

6. The test device as defined in one of the preceding points, wherein at least one support comprises an element of the bearing half-jewel or bearing jewel type for pivoting the at least one first pivot in relation to the at least one support.

7. The test device as defined in one of the preceding points, wherein it comprises at least one axial stop intended for limiting the displacement of the timepiece shaft along the axis of rotation.

8. The test device as defined in one of the preceding points, wherein the element for applying a mechanical force comprises an end that is in the form of an edge and is intended to come into contact with the timepiece shaft.

9. The test device as defined in the preceding points, wherein the end is made:
   of a reinforced or non-reinforced polymer, or
   of a composite, or
   of rubber, or
   of an elastomer, or
   of polypropylene (PP), or
   of polycarbonate (PC), or
   of polymethyl methacrylate (PMMA), or
   of a photopolymerizable resin, or
   of nylon.

10. The test device as defined in point 8 or 9, wherein the edge is formed by two planes that form an angle of between 1° and 30°, preferably 10°, and/or wherein the edge has a length of between 0.9 mm and 150 mm.

A test method according to the invention is defined by point 11 below.

11. A method for testing a timepiece shaft comprising at least one first pivot and an axis of rotation, the method comprising the following steps:
    disposing the timepiece shaft so as to bear against a rest comprising two supports intended to accommodate the timepiece shaft, at least one of the two supports of which is intended to accommodate the at least one first pivot,
    applying a mechanical force to the timepiece shaft such that this force is at least partially taken up by the support at the at least one first pivot, the mechanical force being applied using an element for applying a mechanical force to the timepiece shaft,
    setting the element for applying a mechanical force in movement in relation to the rest such that the timepiece shaft is driven to rotate about the axis of rotation by a relative movement of the element for applying a mechanical force and the rest, notably by a translational movement of the element for applying the mechanical force to the surface of the timepiece shaft.

Various embodiments of the method are defined by points 12 to 14 below.

12. The test method as defined in the preceding point, wherein the following are measured:
    the mechanical force applied to the timepiece shaft, and/or the movement of the timepiece shaft,
    during the step of applying a mechanical force and/or during the step of setting in movement.

13. The test method as defined in point 11 or 12, wherein the mechanical force is applied to the timepiece shaft in accordance with a predefined setpoint force.

14. The test method as defined in one of points 11 to 13, wherein the mechanical force is applied to the timepiece shaft such that this force is at least substantially perpendicular to the axis of rotation.

A manufacturing and/or checking method according to the invention is defined by point 15 below.

15. A method for manufacturing and/or checking a timepiece shaft, comprising the implementation of a test method as defined in one of points 11 to 14.

BRIEF DESCRIPTION OF THE DRAWINGS

The appended drawings show, by way of example, one embodiment of a test device.

DETAILED DESCRIPTION OF PARTICULAR EMBODIMENTS

One embodiment of a test device 3 is described below with reference to FIGS. 1 to 8. The device defines and/or tests a mechanical property of a timepiece shaft, notably the mechanical strength of a pivot, in particular the flexural strength of a pivot or an elastic limit of a pivot.

The test device 3 or apparatus or equipment notably dynamically tests the strength of a timepiece shaft, in particular of a balance shaft or of an escapement-wheel shaft. The test device 3 is more particularly suitable for timepiece shafts made of a ductile material or a fragile material. The test device 3 comprises a support for simulating the guidance of the timepiece shaft in a timepiece movement such that the dynamic test reproduces as faithfully as possible the stresses to which the timepiece shaft may be subjected, for example to identify defective timepiece shafts or to validate a specific shaft geometry.

A timepiece movement comprises various types of shaft, such as for example a balance shaft or an escapement-wheel shaft, which are subjected to mechanical stresses when they are operating in the movement, notably in the event of impacts. The test device 3 tests the flexion and/or impact resistance of these various timepiece shafts.

A timepiece shaft, in particular a balance shaft, comprises, at each end, a pivot shank extended by a pivot. During acceleration, in particular as a result of one or more impacts, each of the pivots is subjected to actions by the bearing with which it interacts. Following the orientation of this acceleration, the pivot will be subjected to an action by the endstone jewel (axial compressive loading) and/or the holed jewel (radial flexural and/or shear loading), since these jewels are incorporated in said bearing. The mechanical properties of the pivot therefore have to be sufficient to withstand the compression against the endstone jewel and the flexion and/or shear against the holed jewel without exhibiting plastic deformation, crack formation or breakage. The strength of the pivot is affected by the structure of the material and the geometry of the timepiece shaft, in particular its dimensions, its shape and its surface finish. More particularly, for timepiece shafts made of a fragile material, the concentrations of localized stresses can have dramatic consequences if they are located at sites of intrinsic defects of the material, such as cracks, which could thus propagate very rapidly and lead to the premature breakage of the timepiece shaft.

The device 3 for testing timepiece shafts makes it possible to apply load to a timepiece shaft over its entire circumference by setting the timepiece shaft in rotation about its geometric axis during the test.

The timepiece shaft 1 to be defined and/or tested comprises at least one first pivot 10, 10' and an axis of rotation A1. For example, the timepiece shaft 1 comprises a first pivot 10, a second pivot 10' and an axis of rotation A1. The timepiece shaft is preferably a balance shaft or an escapement-wheel shaft. The axis of rotation A1 is preferably an axis of a geometry of the shaft that exhibits symmetry of revolution.

The test device 3 comprises:
- a rest 2 comprising two supports 12, 12' intended to accommodate the timepiece shaft 1 at its two ends, at least one of the two supports 12, 12' of which is intended to accommodate the at least one first pivot 10;
- an element 4; 4' for applying a mechanical force to the timepiece shaft at least substantially perpendicularly to the axis of rotation A1 such that this force is at least partially taken up by the support 12 at the at least one pivot 10;
- a means 7, 43; 43' for displacing one or the other of the rest 2 and the element 4; 4' for applying the mechanical force that displaces them in relation to one another in a plane perpendicular to the applied force, in a direction perpendicular to the axis A1.

Moreover, the element 4; 4' for applying a mechanical force may also be an element 4; 4' for driving the timepiece shaft 1 in rotation about the axis of rotation A1, in relation to the rest 2.

In other words, the test device comprises a rest 2 comprising two supports 12, 12', and an element 4, 4' for applying a mechanical force to the timepiece shaft 1 that puts the timepiece shaft 1 under mechanical stress while still driving it in rotation by way of the relative displacement of the rest 2 with respect to the element 4; 4'. It is preferably the case that solely one or the other of the rest 2 and the element 4; 4' for applying a mechanical force to the timepiece shaft 1 can be moved with respect to a geocentric reference system. As a variant, the rest 2 and the element 4; 4' for applying a mechanical force to the timepiece shaft 1 can be moved with respect to a geocentric reference system.

The test device 3 advantageously also comprises:
- means for checking the force applied to the timepiece shaft 1, for example one or more force sensors incorporated in the supports 12, 12' and/or in the element 4; 4' for applying the mechanical force to the timepiece shaft 1,
- means for controlling the displacement and the position in relation to the element 4; 4' for applying the mechanical force to the timepiece shaft 1 with respect to the timepiece shaft 1 and/or to the supports 12, 12', for example one or more drives or actuators 7, 43; 43',
- means for checking the absolute or relative position of the element 4; 4' for applying the mechanical force to the timepiece shaft 1 with respect to the timepiece shaft 1 and/or to the supports 12, 12', for example one or more position sensors (not shown) and/or visualization means 8,
- optionally an illumination means E, and
- a management and recording unit 9.

The position/displacement controlling means and the position checking means make it possible to realize feedback control of the position/displacement.

As will be described in more detail in one embodiment, the timepiece shaft 1 is displaced in rotation about its axis A1 by rolling, preferably by rolling without sliding, under the effect of the element 4; 4' for applying the mechanical force. A relative rolling movement of the timepiece shaft 1 arises on the element 4, 4' for applying the mechanical force. This causes the timepiece shaft 1 to pivot in relation to the supports 12, 12' under the effect of the element 4, 4' for applying the mechanical force. In this movement, the timepiece shaft 1 pivots on the supports 12, 12'.

The supports 12, 12' are part of a rest 2 designed in such a way as to adapt to the specific geometry of the timepiece shaft 1 in order to support the timepiece shaft 1, preferably horizontally, and preferably by simulating the pivoting means, namely the bearings, with which the timepiece shaft is intended to cooperate. In other words, in this embodiment, an attempt is made to reproduce on this support, as faithfully as possible, the pivoting conditions in which the timepiece shaft mounted in a timepiece movement finds itself.

The disposition in relation to the supports 12, 12' and to the element for applying the force are determined by the geometry of the timepiece shaft 1; once their initial positions have been defined and adjusted, the test device 3 makes it possible for multiple shafts having the same geometry to be tested in succession.

The supports 12, 12' may be identical or different. If the pivots 10, 10' of the timepiece shaft are identical, the supports 12, 12' are preferably also identical.

Once the timepiece shaft has been fitted on the rest 2, the axis A1 of the timepiece shaft is preferably parallel to an axis x, notably a horizontal axis x. The axes y and z are perpendicular to the axis x and are mutually perpendicular. Lastly, the axis z is preferably vertical. The axes x, y and z preferably form an orthogonal reference system.

In the exemplary embodiment illustrated, the rest 2 is designed to support a balance shaft 1 in the horizontal position, at its two pivots 10, 10'. The timepiece shaft 1 can pivot freely about a horizontal axis x defined by the support, corresponding to the axis A1 of the shaft once it has been placed on the rest.

For the sake of simplification, since the geometry of the supports 12, 12' is the same here, only the support 12 will be described.

The support 12 comprises a notch 122 dimensioned for accommodating a pivot 10 of the timepiece shaft 1.

Advantageously, the notch 122 has dimensions and a shape that correspond to half of the bearing intended to collaborate with the timepiece shaft 1 in order to guide it horizontally in rotation. Specifically, the notch 122 has a contact area suitable for coming into contact with the pivot of the timepiece shaft 1. The contact area may be for example cylindrical or olived, in such a way that it is as similar as possible to the contact area of the bearing of the movement intended to accommodate the timepiece shaft 1. To that end, the support 12 may comprise a pivot jewel (holed jewel) or a pivot half-jewel for accommodating a pivot. As an alternative, the support may simply have, machined into the material of the support 12, a configuration substantially identical to that of a half-jewel or substantially identical to that of a jewel.

Figure 1:
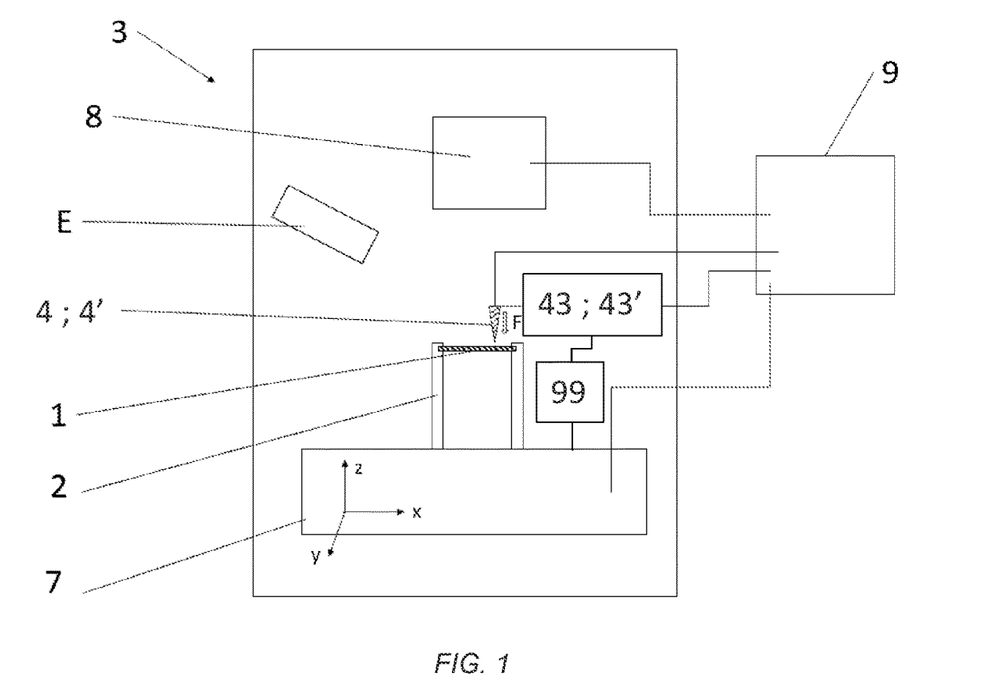
FIG. 1 is a schematic view of one embodiment of a test device accommodating a timepiece shaft.
Figure 2:
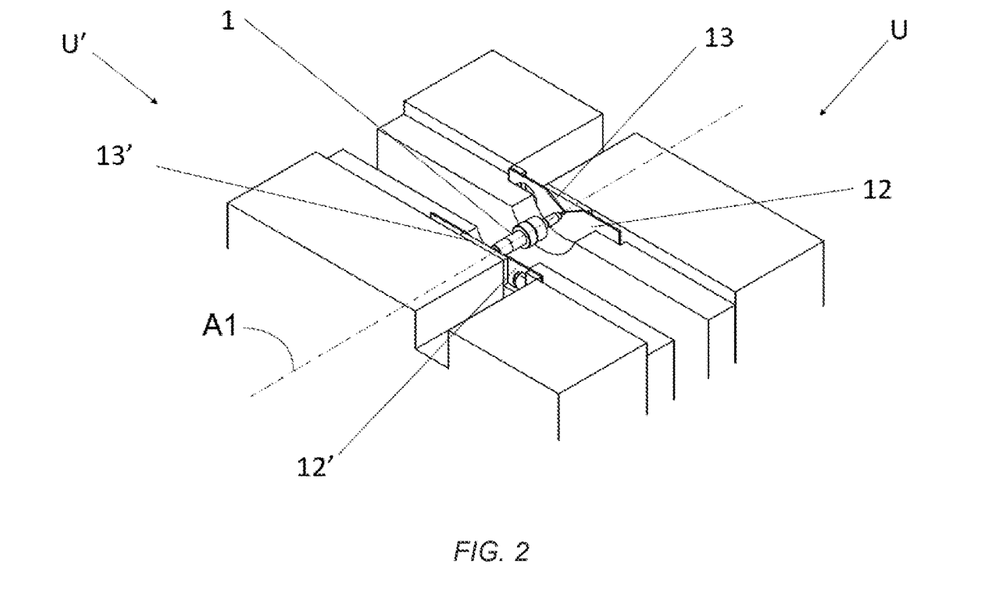
FIG. 2 is a partial perspective view of the embodiment of the test device accommodating a timepiece shaft.
Figure 3:
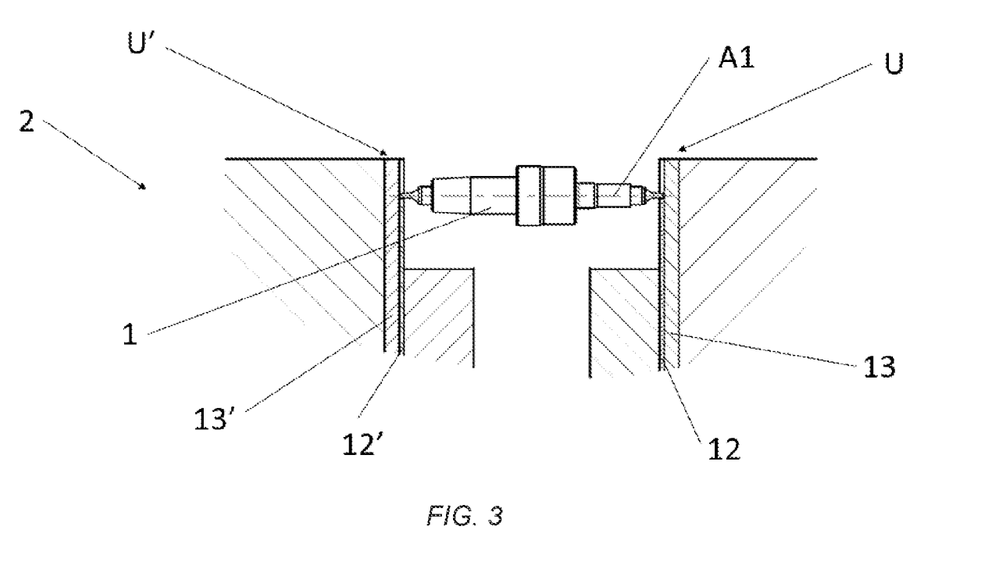
FIG. 3 is a partial sectional view of the embodiment of the test device accommodating a timepiece shaft.
Figure 4A:
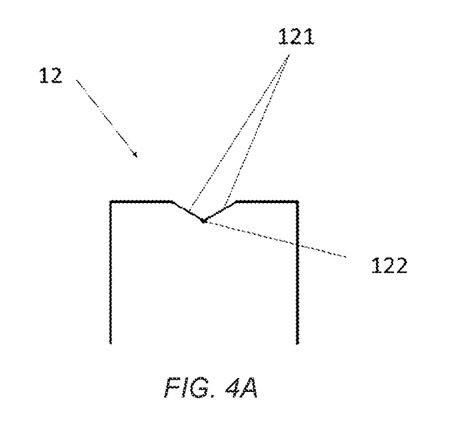
FIGS. 4A and 4B are schematic views of support elements of the test device accommodating a timepiece shaft.
Figure 4B:
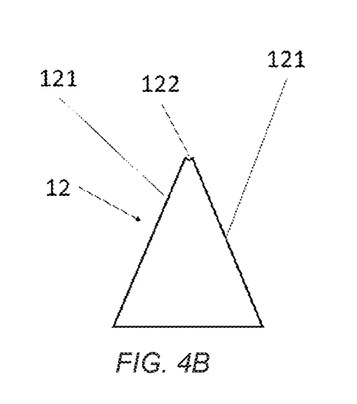

As is shown in FIG. 4A, the support 12 advantageously comprises two guide surfaces 121 in a V shape meeting the notch 122. The two guide surfaces form an angle of between 10° and 180°, for example 90°, so as to make it easier to fit the timepiece shaft 1. As an alternative, the support 12 does not have a guide surface but has an angle, below the notch 122, of greater than 180°, as illustrated in FIG. 4B, so as to make it possible for example to fit the timepiece shaft 1 on the notch 122 in an automated manner. Of course, the support 12 may have any geometry in which it is possible to make a notch 122.

In a variant, when the two supports 12, 12' are different, one of the two supports 12, 12' has a hole in which one of the two pivots is inserted, the hole advantageously having the same diameter as the hole in the holed stone that it simulates. The other support part has a notch 122 as described above.

In another variant, the two supports 12, 12' each have a hole having the same diameter as the holes in the holed stones that said support holes simulate. In such an embodiment variant, at least one of the supports 12, 12' can be moved along the axis x in such a way as to allow the shaft to be fitted. The timepiece shaft 1 is fitted in several steps: inserting the first pivot 10 into the hole in the first support 12, temporarily retaining the timepiece shaft 1 in a horizontal position and moving it closer in a translational movement along the axis x of the second support 12' in order to coincide the hole in the second support 12' and the second pivot 10', calibrating the relative position of the supports 12, 12' so as to optimize the retention of the timepiece shaft 1 (avoiding clearance, applying a predetermined force along the axis of the shaft, etc.)

Moreover, the supports 12, 12' may have multiple notches 122 and/or multiple holes such that multiple timepiece shafts having the same geometry or different geometries are tested in succession.

The cross section of the support 12 in the direction of the axis x is defined in such a way as to determine the bearing area or the bearing point of the pivot 10. By way of example, the notches 122 comprise surfaces in the form of cylinders of revolution in order to facilitate the manufacture of the support 12. The length of the bearing area is preferentially greater than 10% of the length of the pivot in the direction of the axis x. The length of the bearing area is ideally between 10% and 90% of the length of the pivot, or even between 15% and 80%, or even between 20% and 60%, in the direction of the axis x. As an alternative, the notches 122 comprise surfaces of radially progressive revolution (or in the form of a non-cylindrical surface of revolution) in such a way as to regulate the bearing area of the pivot 10 on the support 12. The bearing area of the pivot preferably consists of a bearing point, corresponding to the smallest diameter of the olived jewel or of the olived half-jewel in which the pivot 10 is made to pivot.

In addition to the supports 12, 12', the rest 2 preferably comprises stops 13, 13' that serve to limit the axial clearance of the timepiece shaft 1. These stops 13, 13' thus make it possible to control the bearing areas or bearing points of the pivots 10, 10' on the supports 12, 12' very precisely. Consequently, the test device preferably comprises at least one axial stop 13, 13' intended to limit the displacement of the timepiece shaft 1 along the axis x.

The geometry of the surface of the stops which are made to come into contact with the pivot is selected preferably so as to be similar to that of the endstone jewel that it simulates. Said geometry may be concave, convex or flat. In addition, one and/or the other of the stops is elastic or is returned elastically in order to make it easier to implement the test.

The stops 13, 13' may be in the form of a plate which is thick enough to allow them to function. They may have a thickness on the micrometer scale, on the millimeter scale, or even on the centimeter scale. The stops have a thickness of 200 µm, for example. As an alternative, the stops 13, 13' may be incorporated in the supports 12, 12' and implemented via more complex machining of the notch 122 and of the contiguous area.

The materials of the support 12 and of the stop 13 are selected so as to best simulate the timepiece movement bearing in which the timepiece shaft 1 is intended to be guided. These materials should preferably have tribological characteristics that avoid wear thereof, while still avoiding any deterioration in the integrity of the surface of the timepiece shaft 1 to be defined and/or tested, notably in the event of a proving test. The support 12 and/or the stop 13 may be made of the same material as the timepiece movement bearing in which the timepiece shaft 1 is intended to be guided, for example of ruby, of ceramic, of a hard metal alloy, of a cuprous alloy, of precious metals, or of any other suitable material, for example of nickel or of a nickel (Ni) alloy, notably of a nickel-phosphorus (NiP) alloy.

The support 12 and the stop 13 may be made of the same material or of different materials.

The support 12 is for example made of nickel (Ni) and manufactured using LiGA technology. Thus, as a variant, the support 12 may incorporate a jewel or a half-jewel made of ruby, which may be inserted during the LiGA manufacture.

The stop 13 is for example made of nickel (Ni) and produced by LiGA. Thus, as a variant, the stop 13 may incorporate a jewel made of ruby, which may be inserted during the LiGA manufacture.

The surface of the support 12 and/or of the stop 13 made to be in contact with the timepiece shaft 1 to be defined and/or tested may optionally be provided with a suitable coating or surface treatment. The coating or the surface treatment may be for example applied solely to the surface of the support 12 and/or of the stop 13 that are made to be in contact with the pivot of the timepiece shaft 1. Other surfaces of the support or of the stop may also have such a coating or surface treatment.

The support 12 and the stop 13 are provided so as to be easily replaceable, whether to adapt the rest 2 to the dimensions or to the type of a timepiece shaft 1 or to remedy the wear of the support 12 and/or of the stop 13 by replacing these elements.

The supports 12, 12' and the stops 13, 13' are assembled on the units U, U' for positioning them on the rest 2. These units incorporate force sensors that measure the force taken up by the supports 12, 12' at the time of the test.

Each unit U and U' preferably can be independently moved in the plane x-y, in order to make it possible to position the timepiece shaft on the support, including the adjustment of the clearance at the stops 13, 13', and to position the timepiece shaft 1 in relation to the element 4; 4' for applying a mechanical force to the timepiece shaft. As an alternative, the units U and U' are integral. The units U and U' preferably can be displaced together in the plane x-y in order to position the timepiece shaft 1 in relation to the element 4; 4' for applying a mechanical force to the timepiece shaft, notably during the test.

Individual adjustment of the units U and U' along the axis z is optionally provided in order to be able to customize the horizontality of the timepiece shaft in order to fit it for the test or during the test if necessary.

The units U and U' optionally can be displaced together along the axis z so as to apply a force F to the bearing points of the timepiece shaft on the supports 12, 12' and to the element 4 for applying a mechanical force to the timepiece shaft, notably during the test. It is possible for the displacements to be driven, or not.

The element 4; 4' for applying a mechanical force to the timepiece shaft comprises a rigid structure arranged to bear against the timepiece shaft 1, notably against a surface 42 of the timepiece shaft 1, notably a surface 42 of revolution of the axis A1. The surface 42 of the timepiece shaft is cylindrical or frustoconical. The element 4; 4' for applying a mechanical force to the timepiece shaft 1 is preferably arranged so as to exert a force perpendicularly or substantially perpendicularly to the axis A1. This force is preferably a vertical or substantially vertical force directed along the axis z.

The element 4; 4' for applying a mechanical force to the timepiece shaft is thus designed to apply a force to the timepiece shaft that is placed bearing on the supports 12, 12'. Below and with reference to the embodiment illustrated, the element 4 for applying a mechanical force to the timepiece shaft may more particularly be referred to as a "knife".

The end 41 of the knife 4 in contact with the timepiece shaft is dimensioned in such a way that its thickness, in the direction of the axis x of rotation of the shaft, ensures that the force applied at the surface 42 of the timepiece shaft 1 is precisely transmitted in such a way that this force can be taken up by the pivots 10, 10' of the timepiece shaft 1 at the supports 12, 12'.

Moreover, the end 41 of the knife 4 in contact with the timepiece staff is dimensioned in such a way that its length allows the timepiece shaft to be set in rotation by way of the relative displacement of the knife 4 and the rest 2.

The length of the end 41 of the knife 4, in the direction y perpendicular to the axis of rotation A1 of the shaft, is at least equal to the circumference of the surface 42. The length is advantageously 1.5 times the circumference of the surface 42 of the shaft, in order to be able to support, to apply load to and to generate at least one revolution of the shaft, or is a multiple of the circumference of the surface 42 plus 0.5 times said circumference, so as to allow multiple measurement revolutions to be performed. The length of the end 41 is for example between 0.5 mm and 150 mm. In this way, the knife 4 has a length such that it brings about at least one revolution of the timepiece shaft 1 when it is displaced without sliding on the timepiece shaft 1 along a full travel of the knife 4.

The knife 4 should be rigid enough to not be significantly deformed and to preserve its geometric integrity throughout the test.

The knife 4 is thus made of a suitable material in order to best transmit the forces to the timepiece shaft 1. The end 41 is designed to not damage the surface 42 of the timepiece shaft and to set the timepiece shaft 1 in rotation (on account of the friction at the interface between the end 41 and the timepiece shaft) when the knife is set in movement in relation to the balance shaft, or when the rest 2 is set in movement in relation to the knife, in a translational movement along the direction y, perpendicular to the axis A1 of the timepiece shaft to be defined and/or tested.

The end 41 is preferably made of a polymer, reinforced or not, or of a composite, for example of rubber, of elastomer, of polypropylene, of polycarbonate, of polymethyl methacrylate, of a photopolymerizable resin, of nylon, etc. This means that the surface 42 of the timepiece shaft 1 is not damaged during the measurement and ensures that the timepiece shaft 1 rotates by way of the displacement of the knife on the surface of the shaft. A certain flexibility of the end 41 also optimizes the effective contact surface between the knife and the timepiece shaft to be defined and/or tested, and avoids a peak in the contact pressure value.

The material of the knife is preferably chosen such that the coefficient of friction between the timepiece shaft and the knife is greater than or equal to 0.3.

The knife may be in one piece or in multiple parts. It may for example have a rigid core, and be provided with a coating or a surface treatment that is more flexible on at least part of its surface, in particular on its end 41 that is suitable for coming into contact with the timepiece shaft to be defined and/or tested.

Figure 6:
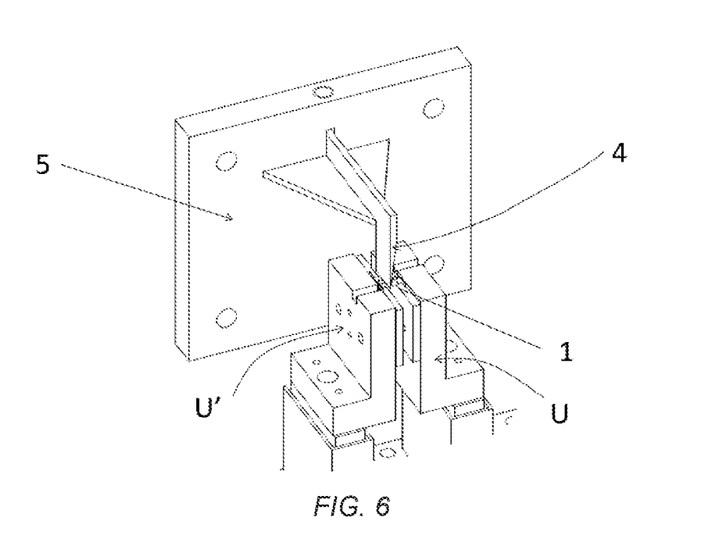
FIGS. 6 and 7 are perspective views of the embodiment of the test device.
Figure 7:
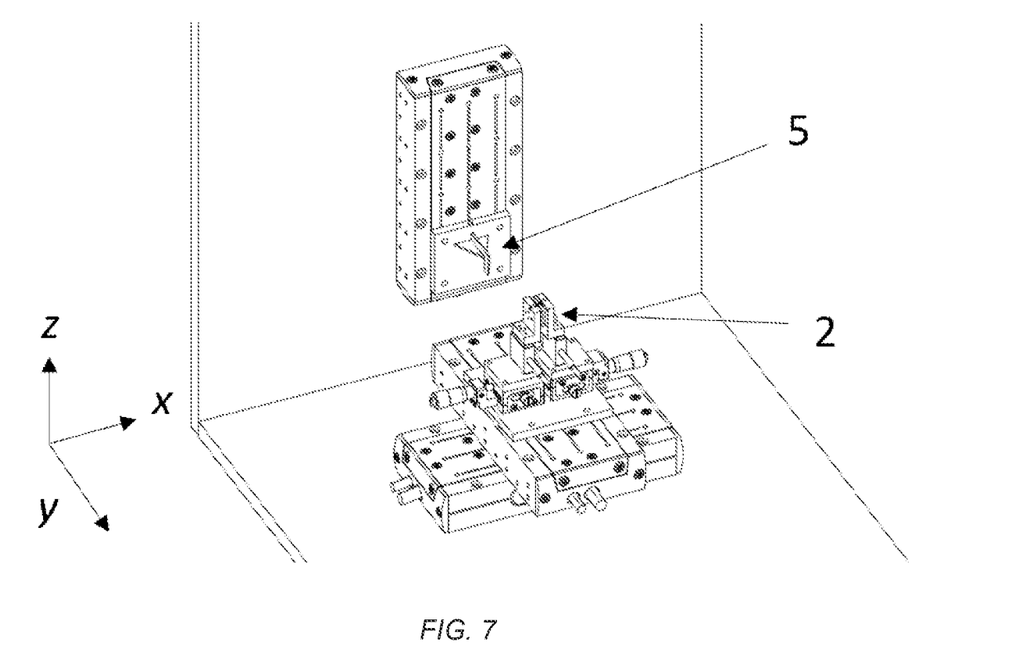

As is shown in FIGS. 6 and 7, the knife 4 may be attached to a support structure 5 suitable for optimizing the transfer of the applied force.

As a variant, the element for applying a mechanical force may comprise a wheel 4' that can be rotated about an axis parallel to the axis A1. In this variant, the displacement of the rest 2 and/or of the support structure 5 makes it possible to relatively position the wheel in contact with the surface 42 of the timepiece shaft 1.

During the execution of the test, the force is applied by way of a displacement of the rest 2 or of the support structure 5 along the axis z. The driven rotation (driven using an actuator 43') of the wheel, the properties (geometry of the periphery 41', material) of which are similar to those of the knife 4, drives the timepiece shaft 1. In this way, the wheel 4' is displaced with respect to the rest 2. As an alternative, the rest 2 may incorporate rotary supports 12, 12'.

Figure 5:
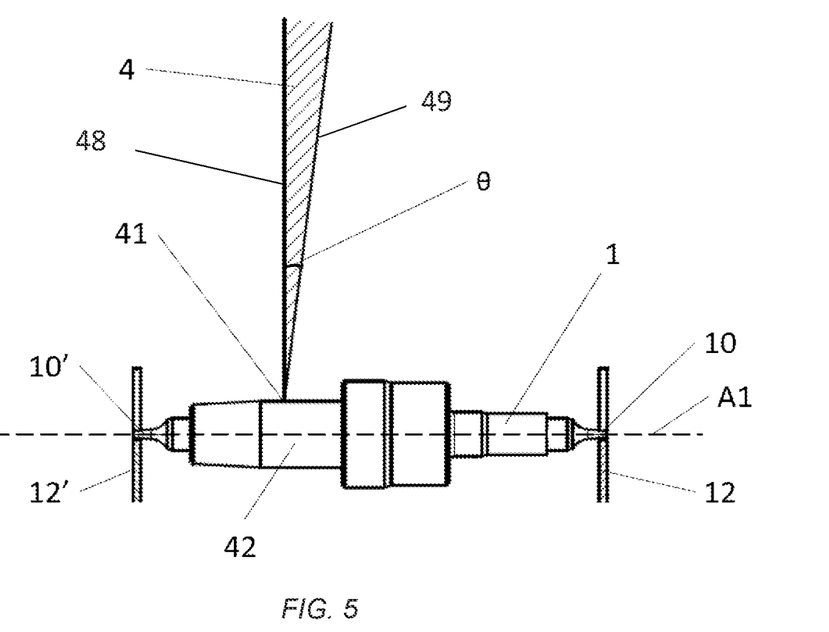
FIG. 5 is a partial sectional view of the embodiment of the test device accommodating a timepiece shaft.

One exemplary embodiment of a knife 4 is illustrated in FIG. 5. The cross section of the knife, in a section in the plane x-z, has the shape of a right-angled triangle, the first side 48 of which is parallel to the axis z (and perpendicular to the axis of rotation A1 of the shaft) and the second side 49 of which forms an angle θ with the first side 48. The cross section of the knife thus has an angle θ at the end 41 that is intended to come into contact with the timepiece shaft 1. The angle θ is between 1° and 30°. It is 10°, for example.

This geometry is advantageous for positioning the knife as close as possible to the pivot 10 without interfering with the support 12 and/or possible changes in the diameter of the timepiece shaft 1. The knife 4 bears on a surface 42 of the timepiece shaft 1 at a predetermined distance from the contact point or the contact area of the pivot 10 on the support 12, in such a way that the distribution of the force applied by the knife 4 to the two supports 12, 12' can be calculated with precision.

As an alternative, the cross section of the knife in a section in the plane x-z has the shape of an isosceles triangle with a vertex angle θ', θ' of between 1° and 30°. As an alternative or in addition, the cross section of the knife may have an end that has a square, polygonal or rounded shape.

In order to be able to subject the at least one pivot 10, 10' to stress over its entire circumference, the test necessitates setting the rest 2 and the knife 4 in relative movement in such a way as to drive the timepiece staff 1 in rotation, while still applying a force F at a surface 42 of the timepiece shaft.

In the preferred embodiment, the rest 2 is placed on a driven structure suitable for displacing the rest 2 with precision in a horizontal plane x-y. The test device 3 comprises a first actuator that displaces the rest 2 along the axis x and a second actuator that displaces the rest along the axis y.

This driven structure both makes it possible to position the rest 2 correctly facing the knife 4 to ultimately allow contact of the end 41 of the knife 4 at the surface 42 of the timepiece shaft 1, and also allows the relative displacement of the rest 2 and the knife 4, retained in a fixed position, in order to carry out the test.

In the variant with a wheel 4', the support structure 5 is supplemented by an actuator that sets the wheel 4' in rotation about an axis parallel to the axis A1 of the shaft. In this variant, the rotation of the wheel 4' replaces the translational movement of the knife 4 in relation to the rest during the test. Everything that is described in the present document for one embodiment comprising a knife 4 may be similarly envisaged for the embodiment comprising a wheel 4'.

As an alternative, during the test, the rest 2 may be fixed and the knife may be able to be moved along the axis y.

For example, the relative movement of the rest 2 and the knife 4 along the axis y is defined in such a way as to reproduce the speeds and accelerations to which the timepiece shaft 1 is intended to be subjected in the timepiece movement. Consequently, the speed of the knife along the axis y may be non-constant over its travel.

The support structure 5 bearing the knife 4 or the wheel 4' is driven along the axis z in relation to a frame 99 of the test device 3, so as to allow the relative positioning of the knife 4 or of the wheel 4' on the timepiece shaft 1 in order to place the end 41 of the knife 4 or of the wheel 4' in contact with the surface 42 of the timepiece shaft 1, and so as to allow the subsequent application of the force to the timepiece shaft 1 during the test. The frame is a fixed frame. In other words, the frame is intended to remain in a fixed position in relation to a geocentric frame of reference, in common use, in particular during a test.

In addition or as an alternative to this preferred embodiment, the support structure 5 may be driven along the three axes x, y and z, using three actuators, in order to relatively position the end 41 of the knife 4 and the timepiece shaft 1 solely by way of the displacement of the support structure 5.

In addition or as an alternative to this preferred embodiment, the rest 2 may be driven along the three axes x, y and z, using three actuators, in order to relatively position the end 41 of the knife 4 and the timepiece shaft 1 solely by way of the displacement of the rest 2.

In the preferred embodiment, the force applied by the knife 4 is controlled by the displacement along the axis z of the structure 5. The knife 4 and/or the support structure 5 are optionally connected to a force sensor for measuring the force applied to the timepiece shaft. The force taken up by the knife 4 corresponds to the total load applied to the timepiece shaft. This force may be constant or variable during the test; it is typically between 0 and 10 N.

As an alternative, the knife 4 is fixed along the axis z and the application of the force F is provided by the displacement of the rest 2 along the axis z.

The force applied by the knife 4 is feedback-controlled during the measurement with a control loop in order to keep the desired force within a predetermined tolerance throughout the test, irrespective of possible irregularities on the circumference of the surface 42.

The rest 2 is displaced along the axes x and y in such a way as to position the timepiece shaft 1 vertically beneath the end 41 of the knife 4, specifically so as to place the surface 42 below the end 41 of the knife 4. This displacement may be performed manually or automatically. A magnifier system or a camera checks the relative position of the knife 4 and of the timepiece shaft 1.

In the embodiment illustrated, once the end 41 of the knife 4 has come into contact with the timepiece shaft 1 and the force F has been applied, the rest 2 is displaced along the axis y in such a way as to set the timepiece shaft 1 in rotation.

Of course, any other combination of displacements that allow the relative movement of the knife 4 and the rest 2 remains possible.

The displacements of the rest 2 and of the knife 4 or of the wheel 4' are controlled by a management and recording unit 9, which also collects the data from the force sensors incorporated in the support structure 5 of the knife 4 or of the wheel 4' and the supports 12, 12'. The displacement speeds and accelerations are typically between 0 and 3 m/s and between 0 and 85 m·s$^{-2}$, respectively.

The management and recording unit thus integrates the data from various sensors or instruments that measure, for example, the following parameters:
- the position of the knife 4 with respect to a given frame of reference and/or with respect to the timepiece shaft 1 to be tested,
- the displacement of the knife 4 with respect to the timepiece shaft 1 to be tested, along the axis z,
- the displacement of the rest 2 in the plane x-y, more particularly in the direction y,
- the force taken up by the knife 4,
- the forces taken up by the supports 12, 12'.

From these measurements, the management and recording unit can calculate:
- the rotational speed of the timepiece shaft 1 about its axis A1,
- the rotational acceleration of the timepiece shaft 1 about its axis A1,
- the angle of rotation of the timepiece shaft 1 about its axis A1.

Figure 8:
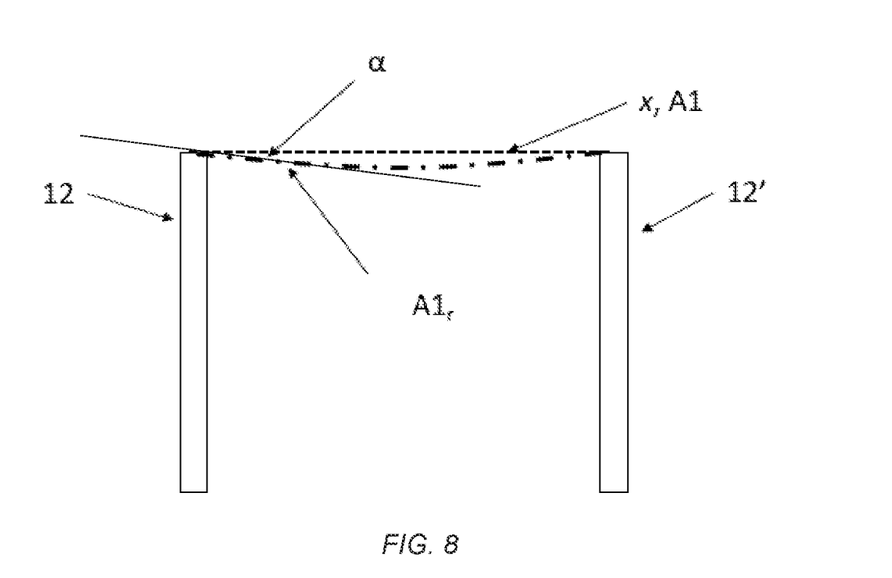
FIG. 8 is a schematic view of the position of the axis of the timepiece shaft at the start of and during the test.

The management and recording unit 9 defines the test parameters and the test sequence. The measurement results are recorded, in particular the force as a function of the relative position of the rest 2 and the knife 4. In the event of a strength test, the relative breaking angle and the breaking load are recorded. The relative breaking angle is the angle between the horizontal axis x and the axis $A1_r$ of the end of the pivot at the moment of breakage, as is illustrated in FIG. 8.

The measurement of the angle of rotation of the timepiece shaft 1 about its axis A1 notably ensures that the timepiece shaft 1 makes at least one revolution during a complete travel of the displacement of the knife 4 and that consequently the timepiece shaft 1 is tested over the entirety of its circumference. If appropriate, this measurement makes it possible to determine the number of revolutions carried out by the timepiece shaft 1.

One embodiment of a method for testing the timepiece shaft 1 comprising the at least one first pivot 10, 10' is described below.

The method comprises the following steps:
a) disposing the timepiece shaft 1 so as to bear on the supports 12, 12' at the at least one first pivot 10 and the second pivot 10', or at the at least one first pivot 10 and a surface of the shaft,
b) applying a force F to the timepiece shaft 1 at a surface 42 by means of the end 41 of the knife 4, at least substantially perpendicularly to the axis of rotation A1, such that this force is at least partially or primarily or quasi-completely or completely taken up by the support 12 at the at least one first pivot 10,
c) driving the timepiece shaft 1 in rotation about the axis of rotation A1 by a relative movement of the knife 4 and the support 12, by virtue of the contact established between the end 41 of the knife and the surface 42 of the timepiece shaft 1.

The method advantageously also comprises a measuring step, during the step of applying the force and/or the step of setting the timepiece shaft 1 in movement, said measuring step comprising:
- measuring the force taken up by the supports 12, 12' transmitted via the bearing surfaces of the pivots 10, 10' on the supports 12, 12', and/or
- measuring the angular position of the timepiece shaft 1 about the axis x, and/or
- measuring the extent of the deformation of the timepiece shaft 1, and/or measuring the position and/or the amplitude of displacement of the knife 4.

In the particular case of a proving test, the method might not comprise a measuring step, but solely a configuration of the force F applied during the test.

The applied force F is preferably controlled and checked as a function of setpoint values, the setpoint values being constant and/or defined by a function, notably a function consisting in increasing the force progressively and/or gradually and/or in determining the setpoint value as a function of the displacement of the knife 4.

Between the steps a) and b) mentioned above, the knife 4 is placed in contact with the timepiece shaft 1 to be tested such that the end 41 of the knife 4 is in contact with a defined surface 42 of the timepiece shaft 1 and such that the knife 4 can then apply a force perpendicular to the axis of rotation A1 of the timepiece shaft 1 to a precise portion of the timepiece shaft, for example to a pivot shank. The initial position along the axis y of the knife 4 is adjusted taking into account the diameter of the timepiece shaft 1 to be tested and the length of the end 41 of the knife 4. By means of a displacement of the support structure 5 along the axis z, the knife 4 is placed in contact with the timepiece shaft 1 with an initial force $F_0$, vertical and perpendicular to the axis of rotation A1 of the shaft, that is measured by a force sensor, notably a force sensor placed on the support structure 5. The approach may be performed visually the first time, using an optical device such as a magnifier or any other suitable device such as a camera 8, in order to ensure the positioning of the knife in relation to the surface 42, then such that it is adjusted by the management and recording unit 9 in order to allow load to be applied gradually and precisely up to a predetermined force F. The knife 4 is also connected to a position sensor in order to check its spatial position.

The steps b) and c) mentioned above are preferably carried out simultaneously. The end 41 of the knife 4 preferably bears on the surface 42 of the timepiece shaft and the rest 2 is moved in translation tangentially to said surface along the axis y, this making it possible to set the timepiece shaft 1 in rotation by rolling on account of friction. The rolling advantageously takes place without sliding. The rotational speed of the timepiece shaft 1 is proportional to the displacement speed relative to the rest 2 with respect to the knife 4 along the axis y.

Checking the rotational speed of the timepiece shaft 1 and the acceleration in translational movement of the knife makes it possible to monitor the setting in rotation of the timepiece shaft and/or the rotation of the timepiece shaft.

As an alternative, the rest 2 is fixed and the knife 4 moves in translation along the axis y in such a way as to cause the rotation of the timepiece shaft 1.

As a variant, the rest 2 and the support structure 5 are fixed and the wheel 4' turns in such a way as to cause the rotation of the timepiece shaft 1.

The rest 2 and/or the knife 4 may be moved in relative translation in the two directions along the axis y, in such a way that the timepiece shaft pivots about its axis A1 clockwise or anticlockwise. Depending on the relative travel performed by the rest 2 and/or the knife 4, the timepiece shaft 1 pivots on itself for a portion of a revolution, one revolution or more. The timepiece shaft 1 preferably pivots for at least one revolution so that the entire circumference of the pivot is tested. By way of example, the timepiece shaft pivots for at least two full revolutions or more, the first revolution in the clockwise direction and the second revolution in the anticlockwise direction, or vice versa.

The force required to drive the timepiece shaft in rotation depends notably on the ratio between the diameter of the tested pivot 10 and the diameter of the surface 42 of the timepiece shaft at the location where the knife 4 is positioned; and on the nature of the surfaces in contact (coefficients of friction and/or of rolling resistance) at the end 41 of the knife 4 and at the timepiece shaft 1; and on the nature of the surfaces in contact (coefficients of friction and/or of rolling resistance) at the supports 12, 12' and the pivots 10, 10' of the timepiece shaft.

The coefficient of friction between the knife 4 and the timepiece shaft 1 is preferably greater than 0.3.

More specifically, the test can be executed in accordance with the following steps, the force setpoints being adapted to the aim of the test:

E1. Selecting, depending on the dimensions of the timepiece shaft to be tested, the elements of the units U and U' (supports 12, 12'; stops 13, 13');

E2. Positioning the previously assembled units U, U' on the rest 2;

E3. Positioning the timepiece shaft 1 on the supports 12, 12', in such a way that it rotates freely;

E4. Positioning the end 41 of the knife 4 in contact with the surface 42 of the timepiece shaft 1 to be tested, at a predetermined distance from the bearing point of the pivot 10 on the support 12;

E5. Starting the test by applying the stress and displacement setpoints, for example:

the force F applied by the knife 4 to the timepiece shaft 1, which corresponds to the position of the knife 4, in particular its position along the axis z;

the displacement travel of the rest 2 or of the knife 4, which determines the number of measurement revolutions, the displacement speed of the rest 2 or of the knife 4, which determines the rotational speed of the timepiece shaft.

E6. At the same time as step E5, measuring and recording the various parameters, for example:

the development of the force applied by the knife 4 as a function of the displacement of the knife 4 and/or the angle of rotation of the timepiece shaft 1 and/or time, the angular position of the timepiece shaft 1, the force measured at the supports 12, 12' or at the knife 4, the force applied at the time the timepiece shaft breaks.

The force applied may be the only force applied throughout the duration of the test, or it may be increased gradually or progressively with each back-and-forth movement of the knife or may be configured in accordance with a defined protocol.

During step E6, the force applied to the at least one pivot 10 or to the two pivots 10, 10' is preferably measured and recorded via sensors positioned in the units U, U' of the rest 2 and/or on the knife 4. This involves recording the development of each of the forces as a function of the relative displacement of the rest 2 and the knife 4 and/or the rotation of the timepiece shaft 1.

Each pivot 10, 10' may be tested individually by displacing the knife 4 in the direction x in order to position it along the axis of rotation A1 of the timepiece shaft 1 as close as possible to the pivot 10, 10' to be tested, in such a way as to apply load primarily to the bearing at this pivot 10 or 10'.

Fitting the timepiece shaft 1 on the rest 2 and bringing the knife 4 closer are made easier by the use of a visualization means 8, for example a stereoscopic inspection microscope with or without an eyepiece, a CCD camera, or any other suitable device.

The visualization means 8 is suitable for checking the positioning of the timepiece shaft 1 on the rest and/or the execution of the measurement.

An illumination means E may optionally supplement the visualization means 8. The illumination means E is separate from or incorporated in the visual checking device.

The test described above may have two aims: it makes it possible to determine, for samples collected from tests, the maximum strength limit of a batch of timepiece shafts when they break, that is to say that it can be used as a strength test. It may also be used as a proving test for eliminating timepiece shafts which have defects that might lead to premature breakage with regard to theoretical forces that they will have to withstand, or as a fatigue test for testing the behavior of a timepiece shaft over time.

For strength tests, the force applied to the timepiece shaft 1 is increased until it breaks.

For proving tests, the force applied to the timepiece shaft 1 is predetermined to remain below the theoretically admissible maximum value for the material, while still being greater than or equal to the force corresponding to the usual stress loading during use. The timepiece shaft 1 does not have to be broken after the test.

For fatigue tests, a predetermined force is applied to the timepiece shaft 1 for a lengthy determined duration.

One embodiment of a method for manufacturing and/or checking a timepiece shaft 1 or a timepiece movement or a timepiece is described below.

The method comprises a phase of implementing a test method as described above.

To implement this method, a timepiece shaft 1 that has been tested or checked or a timepiece movement or a timepiece is obtained.

In the present document, a device and a method for testing a timepiece movement shaft are described. However, they can be applied to any timepiece shaft, irrespective of its nature or its function, and also to any part having a symmetry of revolution, such as a pin, a pinion, an arbor, a tube, or a wristlet bar.

In the present document, a device and a method for testing a timepiece shaft with two pivots are described. However, they can be applied to any timepiece shaft, notably a timepiece shaft having a single pivot.

The testing devices and method described in the present document are particularly suitable for testing timepiece shafts made of ductile materials, notably timepiece shafts made of steel or of a high-performance alloy or of a high-entropy alloy. However, they may also be used to test timepiece shafts made of other materials, such as timepiece shafts made of an amorphous alloy, of glass, of ruby, of ceramic, of a composite with a metallic matrix or a ceramic matrix, or of a material comprising carbon fibers.

In the test method, a force is preferably applied to the timepiece shaft while the timepiece shaft is rotating. This makes it possible to apply load to the timepiece shaft in all of its angular positions about its axis A1. However, as an alternative, the test device described and the test method described make it possible to perform a test in which load is applied to a timepiece shaft only in a finite and determined number of positions about its axis. To do this, steps b) and c) described above are alternated with a test force F and, during the driving steps c), a minimum force Fm that is just what is necessary to drive the timepiece shaft in rotation is applied. Mechanical loading is then applied to the timepiece shaft in a static manner, since the timepiece shaft is not rotating when the test force F is applied.

By virtue of the solutions of the invention, what is preferably obtained is a means for defining a timepiece component having a symmetry of revolution of the timepiece shaft type, via the combination:

of applying mechanical loading, and of driving the timepiece shaft in rotation, realized simply by way of a rolling phenomenon of a surface 42 of the timepiece shaft 1 under an edge of a knife 4. To do this, the knife 4 is set in movement in relation to the timepiece shaft 1 in a direction tangential to the timepiece shaft 1 notably by way of the displacement of the rest 2 on which the timepiece shaft 1 is positioned.

The test method and device according to the invention make it possible to test a timepiece shaft over the entire circumference of one of its cross sections. This makes these solutions particularly useful for testing timepiece shafts made of materials that are sensitive to localized defects in order to avoid the test being performed at a favorable location around the shaft and ensure that any defect, regardless of where it is on the circumference of the shaft being tested, can thus have loading applied to it and be detected. The solutions can therefore be used for timepiece shafts irrespective of their constituent material.

The invention claimed is:

1. A device for testing a timepiece shaft comprising at least one first pivot and an axis of rotation, the device comprising:
   a rest comprising two supports intended to accommodate the timepiece shaft, at least one of the two supports being intended to accommodate the at least one first pivot, and
   an element for applying a mechanical force to the timepiece shaft, positioned so that the mechanical force is at least partially taken up by the support at the at least one first pivot,
   wherein the element for applying the mechanical force is arranged so that the timepiece shaft is driven in rotation by a translational movement of the element for applying a mechanical force and the rest.

2. The test device as claimed in claim 1, wherein at least one of the following:
   the translational movement of the element for applying the mechanical force with respect to the rest is a displacement along a direction perpendicular or substantially perpendicular to the axis of the timepiece shaft,
   the mechanical force on the timepiece shaft is at least substantially perpendicular to the axis of rotation.

3. The test device as claimed in claim 1, wherein the device comprises:
   a fixed frame, and
   an actuator for driving the element for applying the mechanical force in relation to the fixed frame, an actuator for driving the rest in relation to the fixed frame, or both an actuator for driving the element for applying the mechanical force in relation to the fixed frame and an actuator for driving the rest in relation to the fixed frame.

4. The test device gas claimed in claim 1, wherein the device is arranged so that the translational movement travel of the element for applying the mechanical force with respect to the rest causes at least one revolution of the timepiece shaft about the axis of rotation.

5. The test device as claimed in claim 1, wherein at least one of the two supports comprises a notch for accommodating the at least one first pivot.

6. The test device as claimed in claim 1, wherein at least one of the two supports comprises an element of a bearing half-jewel or bearing jewel for pivoting the at least one first pivot in relation to the at least one of the two supports.

7. The test device as claimed in claim 1, wherein the device comprises at least one axial stop intended for limiting the displacement of the timepiece shaft along the axis of rotation.

8. The test device as claimed in claim 1, wherein the element for applying the mechanical force comprises an end that is in the form of an edge and is intended to come into contact with the timepiece shaft.

9. The test device as claimed in claim 8, wherein the end is made:
of a reinforced or non-reinforced polymer, or
of a composite, or
of rubber, or
of an elastomer, or
of polypropylene (PP), or
of polycarbonate (PC), or
of polymethyl methacrylate (PMMA), or
of a photopolymerizable resin, or
of nylon.

10. The test device as claimed in claim 8, wherein the edge is formed by two planes that form an angle of between 1° and 30°, and wherein the edge has a length of between 0.9 mm and 150 mm.

11. The test device as claimed in claim 8, wherein the end comprises a material selected from the group consisting of:
a reinforced or non-reinforced polymer,
a composite,
rubber,
an elastomer,
polypropylene (PP),
polycarbonate (PC),
polymethyl methacrylate (PMMA),
a photopolymerizable resin,
nylon.

12. The test device as claimed in claim 8, wherein the edge is formed by two planes that form an angle of about 10°.

13. The test device as claimed in claim 8, wherein the edge has a length of between 0.9 mm and 150 mm.

14. A method for testing a timepiece shaft comprising at least one first pivot and an axis of rotation, wherein the method uses the test device as claimed in claim 1, the method comprising:
disposing the timepiece shaft so as to bear against the rest comprising the two supports intended to accommodate the timepiece shaft, at least one of the two supports being intended to accommodate the at least one first pivot,
applying a mechanical force to the timepiece shaft so that the mechanical force is at least partially taken up by the support at the at least one first pivot, the mechanical force being applied using the element for applying the mechanical force to the timepiece shaft,
setting the element for applying the mechanical force in movement in relation to the rest so that the timepiece shaft is driven to rotate about the axis of rotation by a relative movement of the element for applying a mechanical force and the rest.

15. The test method as claimed in claim 14, wherein the following are measured:
the mechanical force applied to the timepiece shaft,
the movement of the timepiece shaft, or
both the mechanical force applied to the timepiece shaft and the movement of the timepiece shaft,
during the applying of the mechanical force during the setting in movement, or both during the applying of the mechanical force and during the setting in movement.

16. The test method as claimed in claim 14, wherein the mechanical force is applied to the timepiece shaft in accordance with a predefined setpoint force.

17. The test method as claimed in claim 14, wherein the mechanical force is applied to the timepiece shaft so that the mechanical force is at least substantially perpendicular to the axis of rotation.

18. A method for manufacturing a timepiece shaft, comprising implementing the test method as claimed in claim 14.

19. The test method as claimed in claim 14, wherein the setting in movement is so that the timepiece shaft is driven to rotate about the axis of rotation by a translational movement of the element for applying the mechanical force to the surface of the timepiece shaft.

20. The test device as claimed in claim 1, wherein the device is arranged so that the translational movement travel of the element for applying the mechanical force with respect to the rest causes at least one and a half revolutions of the timepiece shaft about the axis of rotation.

21. The test method as claimed in claim 19, wherein a rotation movement of the timepiece shaft is a rolling movement without sliding of the timepiece shaft on the element for applying the mechanical force.

22. A device for testing a timepiece shaft comprising at least one first pivot and an axis of rotation, the device comprising:
a rest comprising two supports intended to accommodate the timepiece shaft, at least one of the two supports being intended to accommodate the at least one first pivot, and
an element for applying a mechanical force to the timepiece shaft, positioned so that the mechanical force is at least partially taken up by the support at the at least one first pivot,
wherein the element for applying the mechanical force is arranged so that the timepiece shaft is driven in rotation by a relative movement of the element for applying a mechanical force and the rest, wherein the relative movement is a rolling movement without sliding of the timepiece shaft on the element for applying the mechanical force.

* * * * *